June 30, 1953  L. LEE II  2,643,513
INTERNAL-COMBUSTION ENGINE FUEL AND SPEED CONTROL
Filed April 8, 1949  3 Sheets-Sheet 2

INVENTOR
*Leighton Lee II*
BY
*Arc Prentiss*
ATTORNEY

INVENTOR
Leighton Lee II
BY
ATTORNEY

Patented June 30, 1953

2,643,513

UNITED STATES PATENT OFFICE 2,643,513

INTERNAL-COMBUSTION ENGINE FUEL AND SPEED CONTROL

Leighton Lee II, Rocky Hill, Conn., assignor to Niles-Bement-Pond Company, West Hartford, Conn., a corporation of New Jersey Application April 8, 1949, Serial No. 86,356

30 Claims. (Cl. 60—39.28)

This invention pertains to automatic control apparatus for internal combustion engines and more particularly has reference to controls for internal combustion engines of the gas turbine and jet types.

The invention is especially applicable to internal combustion engines for propeller-propulsion, jet-propulsion (turbo-jet), or propeller-and-jet (prop-jet) propulsion of aircraft. Such engines usually include an air inlet, an air compressor, one or more combustion chambers, a gas turbine, and a tail pipe for discharging combustion gases to the atmosphere, except that ram-jet engines have no air compressor or gas turbine. Associated with these engines is a fuel system including a pump for delivering fuel to the combustion chambers. This invention concerns apparatus to control the engine speed and power by controlling the fuel supply as a function of several variables, including engine speed, engine temperature, and other engine operating conditions, and a manual control.

Owing to structural and metallurgical limitations, engines of the type referred to cannot be safely operated at speeds and temperatures exceeding predetermined limiting values, but for maximum economy of operation, both speed and temperature of engine must be maintained at or near these limiting values. On the other hand, while engine speed is a critical factor in flight performance of aircraft, an engine cannot be operated at maximum speed in all flight maneuvers, at all flight speeds, or under all flight conditions. Fuel control apparatus should, therefore, enable the operator to vary engine speed as desired from a minimum required power to the predetermined limit of speed and full power. The control of engine temperature is preferably an automatic function of the fuel control apparatus, during transient conditions.

The value of engine speed corresponding to any given value of fuel flow, varies as a function of the altitude of flight, flight speed, air density at the engine air inlet, engine torque, fuel quality and a wide variety of other factors. For precise regulation of engine speed or to avoid excessive temperatures, it is therefore not feasible to rely solely upon automatic regulation of fuel flow as a function of variables which exclude engine speed and temperature.

Heretofore it has been proposed to control engine performance by regulating the fuel supply to the engine by means of a regulator, in the form of a self-contained unit running on its own fluid, which produces an hydraulic pressure that is transmitted to a variable delivery fuel pump so designed that its delivery varies in a desired relationship to the transmitted pressure. Such a control apparatus was disclosed in my application for Control Apparatus for Turbojet Engines, Serial No. 746,975, filed May 9, 1947, and assigned to the same assignee as this application. Recent experience in operating aircraft under conditions of very low temperatures has shown that better control performance may be obtained if the fuel control works directly on the fuel supplied to the engine rather than on the fuel pump. Accordingly, the new type of fuel control herein disclosed is devised to function either by regulating a variable delivery fuel pump or by directly regulating the fuel supply to the engine and is, not only capable of performing the functions of the apparatus disclosed in my prior application, cited, but also has some advantages not offered by that apparatus.

The objects of this invention are:

(1) To provide an improved fuel control system wherein the fuel flow regulating unit acts either upon a variable displacement fuel pump or directly on the fuel supplied by a constant displacement pump to regulate its flow to the engine.

(2) To provide for an internal combustion engine, an improved fuel control apparatus which will produce a constant engine speed corresponding to the control lever position selected by the operator.

(3) To provide such a control apparatus wherein the maximum safe speed and temperature of the engine will never be exceeded.

(4) To provide such a control which will so function that the engine can be accelerated and decelerated at a maximum rate, corresponding respectively to the maximum temperature permissible ahead of the turbine, and to the minimum fuel flow corresponding to burner blowout conditions. In addition, the fuel flow is never great enough to cause stalling of the compressor.

(5) To provide improved fuel and speed control apparatus for an internal combustion engine employing a plurality of component coordinated hydraulic systems for regulating fuel delivery, said systems being responsive to manual control and to pressure, speed and temperature conditions of the engine.

(6) To provide improved pressure regulating and pressure responsive control elements which may be used in hydraulic apparatus such as mentioned above.

(7) To provide in such apparatus, means for closely controlling acceleration and deceleration of the engine, as a function of a pressure responsive system, and improved means for anticipating speed changes so that "hunting" is eliminated or reduced to a minimum.

With these and other objects in view which may be incident to my improvements, my invention consists in the combination and arrangement of elements hereinafter described and illustrated in the accompanying drawings, in which.

Figures 1, 2:
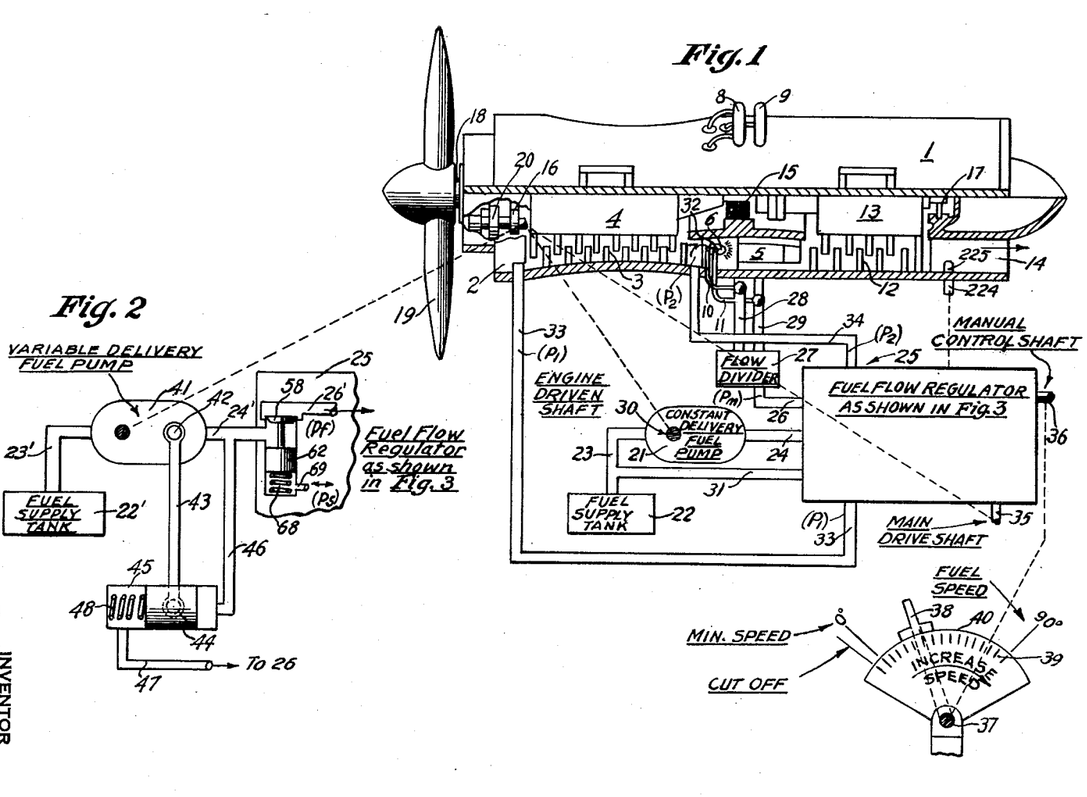
Figure 1 shows, somewhat diagrammatically, an engine suitable for propeller-and-jet propulsion of aircraft, together with its associated fuel flow regulator operating in conjunction with a constant displacement pump and manual control lever, and the principal connections therebetween.
Figure 2 shows an alternate arrangement of the apparatus of Figure 1, wherein the fuel flow regulator controls a variable displacement fuel pump.

Referring to Figure 1 of the drawings, there are shown, as the principal elements of the engine above referred to: a supporting casing 1, an air inlet 2, a multistage air compressor 3, a compressor rotor shaft 4; one each of a number of combustion chambers 5; one each of a series of combustion nozzles 6, connected respectively to two generally circular fuel manifolds 8 and 9, by means of conduits 10 and 11; a multistage gas turbine 12, a turbine rotor shaft 13, connected to the compressor rotor shaft 4; a tail pipe 14 for discharging exhaust gases from gas turbine 12; a center bearing 15 and end bearings 16 and 17, supported by casing 1; a propeller shaft 18, carrying a propeller 19, and a gear train 20, connecting shafts 4 and 18 for rotating propeller 19 at a speed proportional to engine speed and for operating the fuel pump and other accessories. The construction of a turbo-jet engine used solely for jet propulsion is similar to that of the engine shown in Figure 1, except for the omission of the propeller shaft 18 and corresponding modification of the gear train 20.

Figure 3:
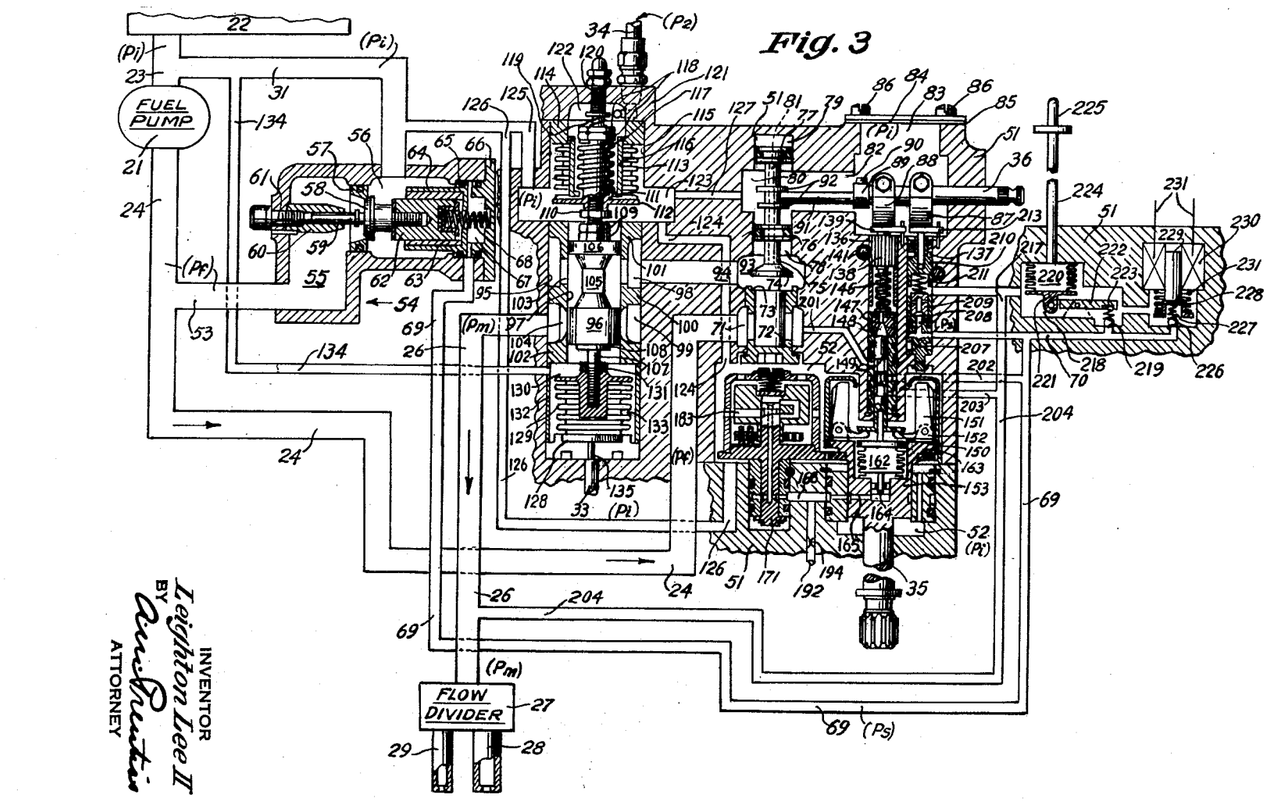
Figure 3 shows, also somewhat diagrammatically, a control apparatus embodying the principles of my invention.

A constant displacement fuel pump 21 draws fuel from a supply tank 22 through a conduit 23 and delivers it through a conduit 24 to the fuel flow regulating apparatus diagrammatically indicated at 25 and shown in detail in Figure 3. From fuel regulator 25 the fuel flow through a conduit 26 to a pressure-responsive flow-divider 27, and from thence through conduits 28 and 29 to fuel manifolds 8 and 9, respectively, in the engine. Pump 21 is operated by a drive shaft 30 connected to gear train 20 in the engine, or any other suitable source of power. The fuel regulator 25 acts to vary the quantity of fuel delivered to the engine per unit of time, as required by the operating conditions, and the difference between the fuel delivered by the pump 21 and the quantity required by the engine is by-passed through a conduit 31 to the inlet side of the pump through a relief valve in the fuel regulator 25.

In each of the combustion nozzles 6 there is a series of fixed slots, one of which is indicated at 7, through which fuel enters the nozzles 6 from conduit 10. The fuel flow from the nozzles is directly proportional to the effective area of slots 7 and is a square root function of the drop across the nozzles between the pressure in conduit 10, which is substantially equal to the pressure in conduit 28, and the pressure ($p_2$) in the combustion chamber 5. As it is desired to limit the range of fuel pressure so that its value at maximum fuel flow is less than that corresponding to the square root function of the drop across slots 7, the nozzles 6 are provided with auxiliary slots 32 supplied by manifold 11 connected to the pressure-responsive flow-divider 27 which opens at a predetermined value of the pressure ($p_m$) in conduit 26. In this manner, the pressure ($p_m$) may be maintained sufficiently high to produce satisfactory nozzle discharge without requiring the fuel regulator 25 and pump 21 to operate under unfavorable pressure conditions at maximum flow.

The fuel flow regulator 25, shown diagrammatically in Figure 1, and in detail in Figure 3, is connected by a conduit 33 to a source of compressor inlet pressure ($p_1$) in the engine, and by a conduit 34 to a corresponding source of compressor discharge pressure ($p_2$). As subsequently explained, the fuel regulator 25 is responsive to the pressure differential ($p_2-p_1$) which is a function of air flow through the engine. The value ($p_2-p_1$) increases as the engine speed increases and as the altitude of flight, or temperature of entering air decreases, and is also a function of the compressor characteristics.

A main drive shaft 35 in the fuel regular 25 is driven by the engine at a speed proportional to engine speed and a manual control shaft 36 is rotatable in response to movement of a shaft 37 to which is fixed the engine control lever 38. Control lever 38 is manually operable in reference to a scale 39 on a fixed quadrant 40, the scale 39 being calibrated in terms of engine speed (R. P. M.).

Figure 2 shows an alternate arrangement of the fuel flow regulating apparatus of Figure 1, wherein the fuel flow regulator 25 operates in conjunction with a variable delivery fuel pump 41 which draws fuel from a supply tank 22' through a conduit 23' and delivers fuel through conduit 24' to regulating apparatus 25. The output of pump 41 is varied by the rotation of a shaft 42 by means of an arm 43 which is pivotally connected to a piston 44 that reciprocates in a cylinder 45. A conduit 46 connects one end of cylinder 45 to the discharge conduit 24' of pump 41, while the other end of cylinder 45 is connected by a conduit 47 to conduit 26 leading from regulating apparatus 25 to nozzles 6 in combustion chamber 5 of the engine 1. A spring 48 is interposed between piston 44 and the left end of cylinder 45 so that piston 44 moves in response to the pressure in conduit 24' opposed by the pressure in conduit 26 and spring 48. When variable delivery fuel pump 41 is used, it replaces constant delivery fuel pump 21 of Figure 1, with some minor changes in the connections between the pump and certain elements of control apparatus 25, as hereinafter described.

Referring to Figure 3, there is shown, somewhat diagrammatically, an embodiment of my invention as indicated in Figure 1, all the principal elements of which are enclosed in a casing 51 having an external connection with conduit 33 for supplying air to the apparatus at the compressor inlet pressure ($p_1$), and with conduit 34, for supplying air to the apparatus at the compressor discharge pressure ($p_2$).

The control apparatus shown in Figure 3 is a self-contained hydraulic system employing the interior of casing 51 as a reservoir 52 which is maintained approximately full of liquid fuel at the inlet pressure ($p_1$) of fuel pump 21 in order to permit the working elements to operate in a lubricating bath. This control apparatus comprises five mechanically and/or hydraulically operated cooperating units as follows:

(1) A by-pass relief valve for regulating the pressure ($p_f$) of the liquid fuel in the conduit 24 on the downstream side of fuel pump 21.

(2) A main fuel metering valve which varies the flow of fuel to the flow-divider 27 and burner nozzles 6, as a function of the pressure rise ($p_2-p_1$) across the compressor 3, to meet the specified conditions of constant engine speed for any given setting of the manual control and of acceleration and deceleration of the engine; the metering valve ports being contoured to give the necessary relation between fuel flow and compressor sensing pressure ($p_2-p_1$).

(3) A manual control whereby the operator may vary the engine speed as desired throughout its permissible operating range, including a cut-off valve for completely stopping all fuel flow to the engine.

(4) A speed control comprising a servo valve, responsive to a speed governor driven by the engine, which varies the pressure equilibrium on the relief valve (1) above and thereby varies the pressure and therewith the rate of fuel delivered to the engine through the metering valve (2) above. This variation in rate of fuel delivery will result in correction of the engine speed in any desired direction. The speed control system includes an inertia mechanism for immediately anticipating the action of the speed governor, in accordance with a change in manual control setting, whereby the "hunting" effect of the speed control is eliminated or reduced to a minimum, and the engine made more quickly responsive to the manual control.

(5) A thermal control for overriding the manual control as a function of engine temperature. Normally, there is no liquid flow through the thermal control, but when the maximum allowable temperature is exceeded, liquid flows through the thermal control and lowers the governor servo pressure ($p_s$) on the by-pass relief valve which reduces the fuel pump discharge pressure ($p_f$). This reduction of fuel pump discharge pressure reduces the rate of fuel supply to the engine and results in reduced engine speed and temperature.

Referring particularly to Figure 3, liquid fuel is supplied from fuel supply tank 22 through conduit 23 to fuel pump 21, at a pump inlet pressure ($p_1$), either under a gravity head as shown in Figure 3, or from a booster pump (not shown) between tank 22 and main fuel pump 21. Fuel issuing from pump 21 flows through conduit 24 and branch conduit 53 to a by-pass relief valve 54 which comprises chambers 55 and 56 between which is located a valve seat 57. Cooperating with valve seat 57 is a valve 58 having an integral valve stem 59 slidably mounted in a sleeve 60 fixed to the wall of chamber 55 by a tap bolt 61. Valve 58 is threadedly attached to a piston 62 slidably mounted in a sleeve 63 which is secured by an outer sleeve 64 fixedly mounted in a cylindrical recess 65 in the right end of chamber 56. A plug 66 closes the right end of chamber 56 and forms with the right end of piston 62 a cylindrical space 67 in which is mounted a spring 68 biasing valve 58 toward its seat 57. A conduit 69 leads from space 67 to a conduit 70 which connects with the manual and thermal controls hereinafter described. Chamber 56 is connected by conduit 31 with conduit 23 on the inlet side of pump 21.

From the foregoing description, it is clear that valve 58 is subject to the pump delivery pressure ($p_f$) in conduits 24 and 53 and chamber 55. When this pressure ($p_f$) exceeds the pressure in space 67, plus the force of spring 68, valve 58 will open and permit liquid fuel to flow from chamber 55 through chamber 56 and conduit 31 to the inlet side of pump 21. The fuel thus by-passed around the pump will reduce the pressure ($p_f$) in conduit 24 until it balances the pressure in space 67 plus the force of spring 68. As valve 58 will float most of the time just off of its seat 57, guide stem 59 closely fitting in sleeve 60 is provided to steady the motion of valve 58 and prevent minor fluctuations and chattering.

Conduit 24 delivers fuel at pump outlet pressure ($p_f$) to chamber 71 in which is mounted a sleeve 72, the upper end of which forms a seat 73 for a manually operated cut-off valve 74. Mounted on stem 75 of valve 74 are two annular flanges 76 and 77 which reciprocate in cylinders 78 and 79 and serve as guides for the movement of valve 74 and hydraulically balance the valve. Flanges 76 and 77 are provided with gaskets which form fluid-tight joints between the flanges and their cylinders 78 and 79, respectively. The upper end of cylinder 78 and the lower end of cylinder 79 open into a chamber 80 in the upper part of casing 51, and cylinder 79 is vented to cylinder 78 through a passageway 81 in stem 75 of valve 74. A horizontal passage 82 connects chamber 80 with another chamber 83 which is hermetically sealed by a cover plate 84 and gasket 85 held in place by tap bolts 86. Manual control shaft 36 is journalled in the right side wall of chamber 83 and extends into said chamber wherein are located cams 87 and 88, each of which is adjustably mounted on shaft 36 by an integral split collar and bolt (see Figs. 5 and 6).

The inner end of shaft 36 carries a crank arm 89 which is adjustably secured to the shaft by a set screw 90, and carries at its other end a pin 91 which extends to the left, at right angles with crank arm 89, and engages valve stem 75 between fixed collars 92 on said stem. The center line of shaft 36 is off-set from the center line of valve stem 75 by the throw of crank arm 89 which is equal to the total vertical travel of valve stem 75 in cylinders 78 and 79. Shaft 36 is rotated 90° by the throw of manual control lever 38, between its 0° position on scale 39, corresponding to minimum engine speed, to its 90° position, corresponding to maximum engine speed, and this 90° rotation of shaft 36 varies the position of valve 74 from its lowest operating position just off of its seat 61 to its highest or full open position. Rotation of manual control lever approximately 5° below its minimum speed (0°) position causes shaft 36, arm 89, and pin 91 to seat valve 74 firmly on its seat 73 which completely cuts off the flow of fuel to the engine, as is hereinafter described.

When valve 74 is in open position (as in Fig. 3), fuel flows through valve chamber 93 and passage 94 to cylinder 95 of main fuel metering valve 96 which reciprocates in a valve sleeve 97 fixedly mounted in cylinder 95. Between cylinder 95 and sleeve 97 are two annular spaces 98 and 99 which are separated from each other by a flange 100 which extends outwardly from sleeve 97 and contacts cylinder 95 with a fluid-tight fit. Upper and lower flanges 101 and 102 similarly fit cylinder 95 and prevent escape of liquid therebetween. A plurality of ports 103 in the upper part of sleeve 97 admit liquid fuel from space 98 into the interior of sleeve 97 and a plurality of ports 104 in the lower part of sleeve 97 permits fuel to flow from the interior of sleeve 97 into space 99 when valve 96 is open, and from thence through conduit 26 to flow-divider 27. Ports 104 have contoured shape, elongated in a vertical direction, and constitute the variable metering orifice of metering valve 96.

Extending upwardly from valve 96 is a reduced portion 105 which is integral with a cylindrical guide member 106 that closely fits in sleeve 97 and serves to guide and steady the moveemnt of valve 96 in said sleeve.

The valve member 96—105—106 has a central, longitudinal bore through which passes a rod 107 having near its lower end an outwardly-extending, integral flange 108 which contacts the lower end of valve 96 and forms a seat therefor. A pair of lock nuts 109 are threaded on the upper end of rod 107 and serve to hold valve member 96—105—106 firmly against flange 108 and thus in fixed relation to rod 107.

Threaded on rod 107 above nuts 109 is another lock nut 110 which serves as an adjustable seat for a sleeve 111 which is threaded over the upper end of rod 107. The lower end of sleeve 111 is provided with an outwardly-extending flange 112 which serves as a base for a pressure-responsive bellows 113 whose upper end is attached to a hollow cylindrical plug 114 which is seated in a bore 115 in the top of casing 51. Plug 114 has a depending tubular extension 116 which terminates in an inwardly-projecting flange that serves as a seat for a spring 117 whose upper end bears against a pair of locked nuts 118 threaded on the upper end of sleeve 111 and which serve to adjust the compression in spring 117. Seated in a recess in the top of sleeve 111 is a light spring 119 whose compression is adjusted by a tap bolt 120 threaded through a cover plate 121 which hermetically seals the upper end of bore 115 and forms the top of a chamber 122 which is connected by conduit 34 to the compressor discharge chamber in engine 1, and receives air under compressor discharge pressure ($p_2$).

Cylinder 95 and sleeve 97 open into a chamber 123 which is connected by a conduit 124 to chamber 52 and by a conduit 125 to conduit 31. A conduit 126 connects conduit 125 with chamber 52. From this arrangement, it will be noted that chamber 123 is supplied with liquid fuel, under pump inlet pressure ($p_i$) through conduits 31 and 125, and chamber 52 is also supplied with liquid fuel under the same pressure ($p_i$) through conduits 31 and 126. A passage 127 and passage 82 connect chamber 123 with chamber 83 so that the chamber 83 is also supplied with liquid fuel under a pressure ($p_i$).

Seated in the bottom of cylinder 95 is a flanged disc 128 which serves as a base closure of a pressure-responsive bellows 129 whose upper end is closed by a cover 130 threadedly connected to the lower end of rod 107 and secured in adjusted relation to said rod by a lock nut 131. A tubular shim 132 forms the outer wall of a chamber 133 and serves as a seat for valve sleeve 97. Chamber 133 is connected by a drain pipe 134 to conduit 31 so that any liquid fuel that leaks past valve 96 into chamber 133 is returned to conduit 23 on the inlet side of pump 21. Disc 128 is provided with an aperture 135 through which the interior of bellows 129 receives air through conduit 33 from air inlet 2 under a pressure ($p_1$).

Figure 4:
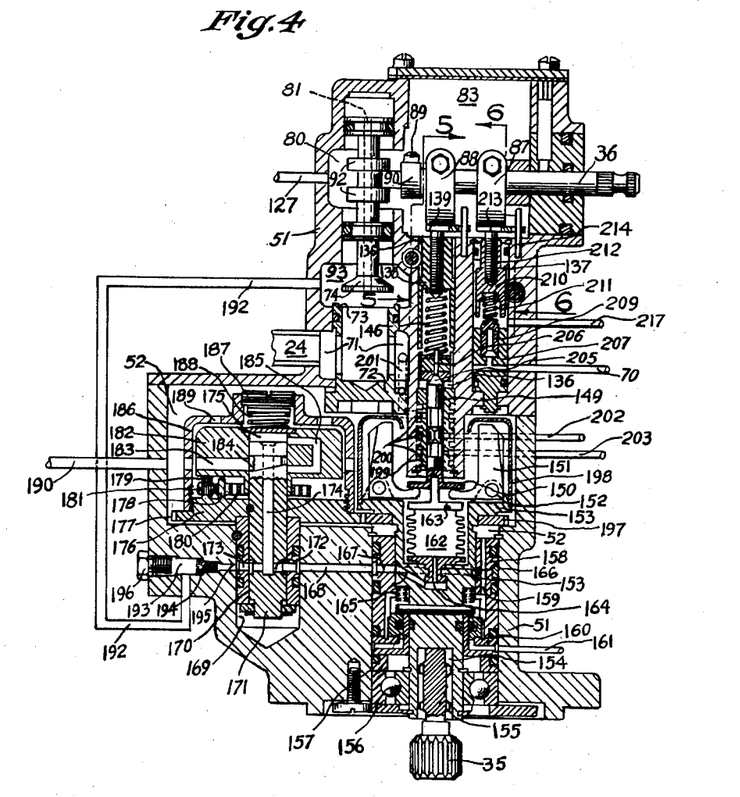
Figure 4 is a central vertical section of part of the regulating unit showing the servo valve, speed governor and manual control cam shaft assembly.
Figure 5:
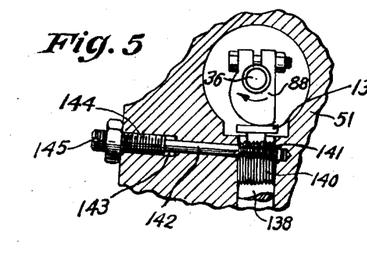
Figures 5 and 6 are fragmentary vertical sections along the lines 5—5 and 6—6 of Figure 4.
Figure 6:
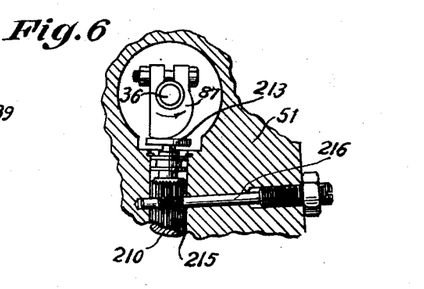

Referring now to Figures 3, 4 and 5, it will be noted that the right-hand part of casing 51 is provided with two vertically disposed, cylindrical bores 136 and 137, each in axial alignment with the vertical center lines of cams 88 and 87, respectively. Slidably and rotatably mounted in the upper end of bore 136 is a plunger 138 whose upper end is internally threaded for the reception of the threaded stem of a cam follower 139 which is mounted on top of plunger 138 and contacts the face of cam 88. Follower 139 has a lateral extension to the right with an aperture for engaging a pin which is fixed in the wall of bore 136 and extends upwardly into chamber 83. (see Fig. 4). Plunger 138 is provided around the periphery of its upper end with a series of gear teeth 140 (Fig. 5) which are pitched at an angle of approximately 7° with the vertical axis of plunger 138. Gear teeth 140 mesh with a worm 141 on the inner end of a shaft 142 rotatably mounted in bore 143 in casing 51. Bore 143 is pitched at an angle of approximately 83° with the vertical axis of plunger 138, so that worm 141 will properly mesh with teeth 140 in plunger 138. The outer end of shaft 142 is somewhat enlarged and provided with threads 144 which engage internal threads in casing 51. The outer end of shaft 142 has a transverse slot 145 for the reception of a screw driver by which shaft 142 can be rotated. A lock nut threaded on threads 144 provides a means for locking shaft 142 in fixed position. When shaft 142 is rotated, it turns plunger 138 about its vertical axis, and since the stem of cam follower 139 is prevented from rotating by its engaging pin, the turning of plunger 138 about its vertical axis causes it to move up or down with reference to cam follower 139 and thus adjusts the position of plunger 138 relative to cam follower 139.

Returning to Figure 3, it will be noted that the lower half of plunger 138 is counterbored to receive a spring 146 which seats at its lower end upon an annular thrust bearing 147 (preferably of carbon). Bearing 147 is supported by a conical washer 148 which rests upon the conical shoulder of a triple-spool servo valve 149. The lower end of servo valve 149 terminates in an annular disc portion 150 which is provided at diametrically opposite points in its bottom face with two notches, each of which receives the lower end of an L-shaped arm 151 pivoted to lugs 152 on the base 153 of a fly-weight speed governor. The lower end of base 153 is provided with a splined aperture 154 for the reception of the splined neck 155 of governor drive shaft 35 driven by the engine 1 (see Fig. 4). Base 153 is supported by a ball bearing 156 mounted in the bottom of casing 51 and is surrounded by a packing gland 157 to prevent escape of liquid fuel which may leak out from chamber 52 between the wall of casing 51 and bearing sleeve 158 of base 153.

Sleeve 158 is provided with a channel 159 which conducts liquid fuel from chamber 52 to a running seal 160 at the bottom of sleeve 158. Any liquid fuel that works past seal 160 is returned to the fuel supply tank 22 by a drain conduit 161. The upper end of base 153 is counterbored to receive a pressure responsive bellows 162 whose upper end is sealed by a disc 163 having an upwardly extending stem which slidably projects into a socket in the lower end of servo valve 149.

The interior of bellows 162 communicates through a central passageway 164 and radial passageway 165 with a circumferential groove 166 in the outer face of base 153. Groove 166 is connected by passageways 167 and 168 with a bore 169 in casing 51 in which is fixedly mounted a bearing sleeve 170 which serves as a journal for a rotating spindle 171 mounted therein. Spindle 171 is provided with a transverse passageway 172 that connects with passageway 169 through registering ports 173 in sleeve 170, and a central passageway 174 which communicates with a space 175 over the upper end of spindle 171.

Fixedly attached to spindle 171 and mounted for rotation on the upper end of sleeve 170 is an annular disc member 176 which has at its lower outer periphery a gear 177 and on its upper face two lugs 178 and 179 for the attachment of a spiral spring 180 by means of a set screw 181 which is threaded through lug 179 and pinches the outer end of spring 180 against lug 178 so as to anchor it thereto. Mounted for rotary movement about the upper end of spindle 171 is a cylindrical inertia member 182 having a radial passageway 183 which communicates with a groove 184 in the outer face of spindle 171. A second U-shaped passageway 185 in inertia member 182 leads from space 175 at its upper end to the face of spindle 171 at its lower end. Spring 180 is attached at its inner end to a downwardly extending tubular boss on inertia member 182 so that the rotation of spindle 171 is transmitted to inertia member 182 through said spring. So long as spindle 171 and inertia member 182 are rotated at the same speed (R. P. M.), the lower end of passageway 185 is partially closed by the outer face of spindle 171, but if spindle 171 is accelerated, say in a clockwise direction when viewed from above, the mass of inertia member 182 causes it to lag behind spindle 171 so that groove 184 is progressively brought into decreasing register with the lower end of passageway 185 by virtue of the inclination of the lower edge of said groove, thereby further closing communication between passageways 185 and 183. At the same time, the lag of inertia member 182 winds up spring 180, thereby increasing its tension and imparting an increased rotating force to inertia member 182 which increases its speed (R. P. M.), whereupon spring 180 gradually unwinds and returns to its original tension, so that when spindle 171 and inertia member 182 are again rotating at the same speed, the end of passageway 185 is again partially closed by the outer face of spindle 171 to the same extent as before acceleration of spindle 171. Conversely, when spindle 171 is decelerated with respect to the speed of inertia member 182, the reverse of the foregoing action takes place, so that the degree of opening of passageway 185 corresponds at all times to the relative speeds of spindle 171 and inertia member 182. A hollow cap 186 is threadedly mounted on disc 176 and affords a cover for inertia member 182. The upper end of cap 186 is threaded for the reception of an adjustable plug 187 which varies the tension of a spring 188 interposed between plug 187 and the upper end of inertia member 182 so as to maintain a predetermined downward force on member 182 in opposition to the upward force of the liquid pressure in space 175. Cap 186 is also provided with a plurality of ports 189 which permit liquid fuel to escape from the interior of said cap into chamber 52 from which said liquid fuel is returned to the inlet side of fuel pump 21 by conduits 190, 126, 125 and 31.

Liquid fuel under pressure ($P_f$) is supplied from chamber 93 to spindle 171 through a conduit 192, bore 193, restriction 194, and passageways 195, 173 and 172. A threaded plug 196 permits the removal of restriction 194 for replacement by a restriction of another size, so that the flow of liquid fuel into spindle 171 may be adjusted as desired. The liquid fuel which is supplied to spindle 171 also enters bellows 162 through communicating passageways 168, 167, 165 and 164, hence the liquid pressure in bellows 162 is varied by the relative rates at which liquid fuel enters spindle 171 through restriction 194 and escapes through passageways 185 and 183 which former is controlled by groove 184 mentioned above. Spindle 171 is driven by the engine at a fixed speed ratio therewith and with speed governor arms 151, by drive shaft 35 through intermeshing gears 177 and 197. As long as spindle 171 and inertia member 182 are rotating at the same speed (R. P. M.) the lower end of passageway 185 has a definite position in relation to the lower, inclined edge of groove 184, as determined by the vertical position of member 182 with reference to spindle 171, which in turn depends upon the balancing of the downward force of spring 188 on member 182 and the upward thrust of the liquid fuel in space 175 on said member.

At a steady engine speed, spindle 171 and inertia member 182 will be rotated at the same speed and the position of the lower end of passageway 185 with reference to the lower, inclined edge of groove 184 will be such that liquid fuel will escape from spindle 171 through passageway 185 as fast as it enters through restriction 194, regardless of variations in pressure of said liquid fuel in conduit 192, since any impedance of this flow through passageway 185 will immediately result in a corresponding increase in pressure in space 175 which will lift member 182 against spring 188 and increase the opening from passageway 185 to groove 184 until steady flow ensues.

If now the engine accelerates its speed, the speed of spindle 171 will temporarily increase beyond the speed of member 182, due to the inertia of the latter, and relative rotation of member 182 on spindle 171 will decrease the opening of passageway 185 with resulting increase in liquid pressure in space 175. This will lift member 182, increasing the compression of spring 188, and correspondingly increase the pressure in passageways 174, 172, 168, 167, 165, 164 and bellows 162 until the speed of member 182 again equals the increased speed of spindle 171, whereupon the increased opening of passageway 185 will again equal that of restriction 194 and the pressure in bellows 162 will return to its original value. Conversely, a deceleration of the engine will result in the reverse of the above actions, and therefore the pressure in bellows 162 is correspondingly responsive to the acceleration or deceleration of engine speed.

Speed governor arms 151 are enclosed in a hollow cylindrical housing 198 fixed to base 153, and the upper ends of said arms are weighted so that, as they are rotated by shaft 35 and base 153, they move outwardly by centrifugal force in proportion to the speed of rotation, and thereby raise servo valve 149 to which they are connected. Servo valve 149 is slidably and rotatably mounted in a valve sleeve 199 which is fixedly positioned in bore 136 and is provided with three circumferential grooves 200 on its outer surface which communicate through ports with conduits leading into bore 136. The uppermost groove 200 is connected by a conduit 201 with chamber 71; the middle groove 200 is connected by a conduit 202 with conduit 69; and the lowermost groove 200 is connected by conduits 203 and 204 with conduit 26. Above the uppermost and below the lowermost groove 200, and between each of said grooves, sleeve 199 is provided with an external groove having a packing ring to prevent leakage between said sleeve and bore 136.

Servo valve 149 is of the triple-spool type, consisting of three cylindrical valve portions accurately fitting the interior of sleeve 199, connected by two rod portions of reduced diameter. The upper end of the top valve portion has a conical shoulder 205 terminating in a small upwardly projecting stem 206 which extends through a central aperture in washer 148 and bearing 147 and serves as a centering means for those elements during the rotation of valve 149 about its vertical axis. There is a sufficient clearance between the outside of washer 148, bearing 147, plunger 138 and bore 136 to permit a small flow of liquid fuel from chamber 52 to chamber 83. This flow not only serves to lubricate and reduce the friction of rotation between valve 149, washer 148 and bearing 147, but also equalizes the liquid pressures in chambers 52 and 83.

The middle valve portion of servo valve 149 is provided with two small V-shaped notches in its outer surface, in vertical alignment, as shown in Figures 3 and 4. These notches are of maximum depth and width at their bases and merge with the full diametral surface of valve 149 at their points. When valve 149 is in its neutral position, as shown in Figures 3 and 4, the space between the middle and lowest valve portions of valve 149 is in horizontal alignment with conduit 203; the space between the middle and upper valve portions of valve 149 is in horizontal alignment with the lower end of conduit 201; while the central part of the middle valve portion of valve 149 between notches therein is in horizontal alignment with conduit 202. When valve 149 is in this neutral position, no flow of liquid fuel can take place past said valve. Since the width of the middle valve portion of valve 149 between its notches is just equal to the width of the groove in sleeve 199 opposite conduit 202, any movement of valve 149 up or down from its neutral position will permit liquid fuel to flow past said valve, first through the notches and then through spaces between the middle and upper or lower valve portions of said valve as its vertical movement continues. Thus, when valve 149 moves down from its neutral position, communication is established between conduits 201 and 202, while an upward movement of valve 149 from its neutral position establishes communication between conduits 202 and 203. The vertical position of valve 149 depends upon the balance of vertical forces acting on said valve. These forces are: (1) the action of arms 151 of the speed governor which push valve 149 upwardly with an increase in engine speed and downwardly with a decrease of engine speed; (2) the expansion and contraction of bellows 162 due to engine acceleration and deceleration, as previously described, which in effect anticipates the action of arms 151 of the speed governor, and also moves valve 149 upwardly with engine acceleration; and (3) the compression in spring 146 which is varied by the throw of cam 88 on the manual control shaft 36. The compression in spring 146 is also adjusted by worm gear mechanism 140—145, as described hereinabove.

Referring to Figures 3 and 4, it will be noted that bore 137 has fixedly positioned in its lower end a sleeve 207 having a central passage 208 which communicates at its lower end with conduit 70 and at its upper end with a counterbore in which is seated a slidable sleeve check valve 209. Above valve 209 in bore 137 is a reciprocable and rotatable plunger 210 which is counterbored at its lower end for the reception of a spring 211 that biases check valve 209 in a closing direction. The upper end of plunger 210 has a threaded socket for the reception of the threaded stem 212 of a cam follower 213 which bears against cam 87 and is restrained from rotation by a pin 214 threaded through an extension on cam follower 213 and fixed to casing 51. Plunger 210 is provided with gear teeth 215 engaged by a worm adjusting screw 216 for rotating said plunger, in all respects similar to the worm adjusting screw for plunger 138 (see Figs. 5 and 6). Rotation of plunger 210 with reference to non-rotating stem 212 moves said plunger up or down in bore 137 and thus varies the tension of spring 211 and consequently the liquid pressure at which check valve 209 opens and establishes communication between conduit 70 and conduit 217 at any given position of cam 87.

Referring to the right hand side of Figure 3, it will be seen that conduit 217 communicates with a chamber 218 which is also connected to conduit 70 through a ball check valve 219. Fixed to the top wall of chamber 218 is a pressure responsive bellows 220 whose bottom wall is pivotally connected to a lever 222 whose other end bears against a spring 223 which biases check valve 219 in a closing direction. The interior of bellows 220 is connected by a conduit 224 to a thermal bulb 225 which is located in the tail pipe 14 of the engine 1 so as to be exposed to the heat of the exhaust gases discharged through the tail pipe. Thermal bulb 225 is filled with a fluid which expands at a predetermined rate with temperature, so that as the temperature of the exhaust gases in tail pipe 14 rises, there is a corresponding increase in the fluid pressure in thermal bulb 225, and vice versa. This pressure is transmitted through conduit 224 to bellows 220 which also expands correspondingly and thereby reduces the compression of spring 223, so that whenever the maximum permissible temperature in tail pipe 14 exists, the force of spring 223 is reduced to a value which causes check valve 219 to be opened by the liquid pressure in conduit 70. The opening of valve 219 permits liquid fuel to escape from conduit 70 through chamber 218 and conduits 217 and 204 to discharge conduit 26. This lowers the pressure ($P_s$) in conduit 69 which in turn permits valve 58 to open wider and thereby reduce the fuel flow through conduit 24 to fuel flow regulator 25 and hence to the engine. The reduction of fuel flow reduces the engine speed and hence temperature below the maximum permissible temperature, whereupon valve 219 closes and steady state operation of the engine is resumed.

Connected in parallel with check valve 219 is a second check valve 226 which is normally biased to closed position by a spring 227 whose upper end is seated in a cup 228 attached to the armature 229 of a solenoid 230. A spring 231 normally maintains cup 228 in its lowermost position, as shown in Fig. 3, when solenoid 230 is not energized. Wire leads 231 connect solenoid 230 to a source of electric energy and a switch (not shown), so that whenever said switch is closed, solenoid 230 is energized and armature 229 and cup 228 are raised to their uppermost position. This reduces the compression in spring 227 so that check valve 226 is opened and the pressure in conduits 70 and 69 is reduced to a value which reduces the fuel flow to the engine to one-half of the flow that would occur when valve 226 is closed. Solenoid operation of valve 226 thus permits the pilot or engine operator to immediately reduce engine speed in case of emergency to prevent overspeeding or overheating of the engine in case any of the automatic controls of fuel flow regulator 25 should fail.

*Operation*

The principles of operation of my improved jet engine control system are as follows:

(1) A constant displacement fuel pump 21 (as in Fig. 1) or a variable displacement fuel pump 21 (as in Fig. 2) furnishes liquid fuel to the regulator 25 which acts to vary the rate of fuel delivery to the engine as required by the specified operating conditions. In the arrangement of Fig. 1, the difference between the fuel delivered by the pump and the quantity required by the engine is by-passed to the inlet side of the pump through a pressure-responsive relief valve 54, while in the arrangement shown in Fig. 2, the quantity of fuel delivered to the engine is regulated by the regulator arm 43 of the pump 41, in response to the pressure differential between the unmetered fuel in conduit 24' and the metered fuel in conduit 26'.

(2) The fuel required by the engine to maintain its operating speed, or to meet the specified conditions of acceleration, is metered through a metering valve 96 which is specially contoured to give the necessary relation between fuel pressure and compressor rise or sensing pressure $(p_2-p_1)$.

(3) The pressure drop across the burner nozzles 6 and flow-divider 27 may be variable for a given rate of fuel flow. The flow through the metering valve 96 only is a function of the compressor sensing pressure differential $(p_2-p_1)$, and in case of stopping up of a nozzle or other obstruction to fuel flow, the pressures adjust themselves to maintain the fuel flow at a constant rate corresponding to the speed of the engine and the position of the manual control lever 38.

(4) During steady state (normal), or fixed manual lever position, operation of my control system, the tension of the speed governor spring 146 is substantially constant and is balanced against the thrust due to the rotating governor weights 151. Any slight increase or decrease of engine speed causes the governor servo valve 149 to rise or fall, which upsets the equilibrium of the relief valve 54, and consequently lowers or raises the pressure and therewith the quantity of fuel delivered, per unit of time, to the engine through the metering valve 96. This variation in rate of fuel delivery to the engine will result in correcting its speed in the desired direction.

(5) Any rate of change of engine speed simultaneously creates a corresponding pressure in bellows 162 which acts directly upon the governor servo valve 149 in the same direction as the weight arms 151 of the speed governor will act with the change of engine speed, thus resulting in an opposite change in fuel flow, due to movement of the servo valve 149. The effect of this additional pressure acting immediately upon the servo valve, before the weight arms of the speed governor have had time to act, is to anticipate the action of the governor arms. This not only makes the speed of the engine more quickly responsive to movements of the manual control lever, but also steadies the action of the control system by eliminating "hunting" therein.

(6) The metered fuel pressure $(p_m)$, minus the compressor discharge pressure $(p_2)$ into which the fuel is discharged from burner nozzles 6, is a specified function of compressor sensing pressure $(p_2-p_1)$. The fuel pump discharge pressure $(p_f)$ is determined from the equilibrium of the relief valve 54; the servo valve pressure $(p_s)$ is determined from the equilibrium of the check valve 206 (except when valve 219 or 226 opens); and the metering head $(p_f-p_m)$ is constant within the variation of the forces of these valve springs 68 and 211 with their displacements.

(7) With the manual control lever 38 in the full open (90°) position and the engine rotating at speeds below full R. P. M., the speed governor will be in the cut-out position, i. e., the servo valve 149 will be displaced a little below the neutral position shown in Figures 3 and 4, so that a restricted flow of fuel occurs through the notches on the middel portion of servo valve 149 from the pump discharge to the rear side of the relief valve piston 62. This is equivalent to connecting the pump 21 discharge direct to the rear side of the relief valve piston 62 through a restricting bleed hole. If the pump discharge is greater than the quantity of fuel that can be pushed through the metering valve orifices 104 by the metering head $(p_f-p_m)$, then the relief valve 58 will be open to by-pass the excess fuel to the pump inlet 23, otherwise the pump discharge pressure $(p_f)$ would build up and disturb the equilibrium of the relief valve assembly 54.

(8) The metering valve 96 is a balanced valve actuated by the compressor sensing pressure $(p_2-p_1)$ and area of the metering orifices 104 is also a function of the compressor sensing pressure alone, so that to each value of the sensing pressure there corresponds only one value of the orifice area, independent of the fuel pressures.

(9) The quantity of fuel metered by the regulator 25 is given by the equation:

$$F = C_m A_m \rho_f \sqrt{2g \frac{144}{\rho_f}(p_f - p_m)} \quad (1)$$

where $F$=fuel flow in pounds per second
$C_m$=discharge coefficient through metering orifices 104
$A_m$=area of metering orifices 104
$\rho_f$=fuel density
$g$=acceleration of gravity
$p_f$=fuel pressure on discharge side of pump 21 in pounds per square inch
$p_m$=metered fuel pressure in pounds per square inch.

This quantity of fuel is sprayed into the combustion chamber 5 through the burner nozzles 6. Since the pressure in the combustion chamber is equal to the compressor discharge pressure $(p_2)$, the pressure head which forces the fuel through the restrictions due to the flow-divider 27 and the burner nozzles 6 is $(p_m-p_2)$, and if the fuel flow into the combustion chamber is some function $(f)$ of this pressure, as determined by the design of the flow-divider, then:

$$F = f(p_m - p_2) \quad (2)$$

Equating Equations 1 and 2, we get:

$$C_m A_m \rho_f \sqrt{2g \frac{144}{\rho_f}(p_f - p_m)} = f(p_m - p_2)$$

or  (3)

$$(p_m - p_2) = \left( C_m A_m \rho_f \sqrt{2g \frac{144}{\rho_f}(p_f - p_m)} \right)$$

Equation 3 states that the fuel pressure head $(p_m - p_2)$ is a function of the area $(A_m)$ of the metering valve orifices 104. Since $A_m$ is a function of the compressor sensing pressure $(p_1 - p_2)$, the fuel pressure head $(p_m - p_2)$ is a function of the compressor sensing pressure, controllable for any particular application by the contour of the metering orifices 104.

Since the fuel pressure head $(p_m - p_2)$ is dependent on the discharge coefficients and the areas of the nozzle jets, etc., an advantage of my control is that in case of clogging of one or more nozzles 6, which will change the discharge characteristics of the nozzles, the fuel pressure will adjust itself to maintain the fuel flow constant as given by Equation 1 above. In so doing, the absolute values of $(p_f)$ and $(p_m)$ will change, but their difference $(p_f - p_m)$ will remain constant.

(10) When the speed governor is in cut-out position and the compressor sensing pressure is held constant, the metering head $(p_f - p_m)$ is a specified function of the manual control shaft 36 rotation, the shape of the curve describing the specified function being determined by the contour of the cam 88.

(11) The engine speed at which the speed governor cuts in and out (i. e., when servo valve 149 is open or closed) is a specified function of the rotation of manual control shaft 36. The speed setting of the governor in terms of manual shaft 36 rotation is determined by the contour of the cam 88 (see Fig. 5). The servo valve 149 is in "neutral" position at one and only one position of the governor weights 151, and consequently for each position of the manual cam 88 there is a single value of the governor spring 146 tension. Any increase in engine speed will raise the servo valve 149, establishing communication between conduits 202 and 203, and thus place a restricted by-pass opening in parallel with check valve 209. This permits the liquid fuel behind relief valve piston 62 to escape into the main fuel passageway 26 downstream from the main metering valve 96, thus reducing the servo valve pressure $(p_s)$ until it finally becomes equal to the metered fuel pressure $(p_m)$.

(12) The raising of the servo valve 149 and the consequent introduction of a by-pass across the check valve 209 therefore results in a loss of metering head, so that the fuel flow past the main metering valve 96 is no longer sufficient to maintain the required engine power output, and the speed will fall, bringing the governor back to its neutral position.

If this were all that is involved, the speed governor would always bring the engine speed back to the value corresponding to the manual control lever 38 setting. However, the governor servo valve 149 having been returned to neutral, there is nothing to restore the metering head to its required value, and the engine speed will continue to fall until the regulator 25 is in the condition indicated in subparagraph (7) above, and the metering head will then build up to normal. The result of the governor action to correct overspeed is therefore an over-correction, resulting in a drop of speed to below the desired value before the desired speed is re-attained. For this reason, the fall in engine speed will not stop when it first reaches the new desired speed, but continues to fall to some lower speed, whereupon the opposite forces acting through the governor and servo valve 149 cause the engine speed to rise past the desired speed to some higher speed. The reversing action of the speed governor then reduces the speed again past the desired speed to some lower speed, and this oscillation in speed continues with progressively reduced amplitude through a series of speeds, alternately higher and lower than the desired speed, until the desired speed is ultimately attained. This action of the governor, known as "hunting," is the same for either deceleration or acceleration of the engine.

In order to eliminate this "hunting" action of the speed governor, I have provided a means for anticipating the action of the speed governor by applying an hydraulic pressure directly upon the servo valve 149 from a movement of the bellows 162 in response to any change in engine speed, as has been described hereinabove. The result of the action of this anticipating mechanism is to change the engine speed more quickly and yet more gradually from one value to another, without overshooting the new desired value. This elimination of "hunting" not only greatly steadies the operation of the engine during acceleration and deceleration, but makes the engine much more quickly and accurately responsive to movements of the manual control lever.

Adverting now to a consideration of the mechanism hereinabove described and illustrated in the drawings, the operation of my improved jet engine control system is as follows:

When the engine is operating under steady state normal, or fixed manual control lever position, the servo valve 149 is in neutral position, as shown in Figures 3 and 4, and the fuel pump 21 supplies liquid fuel to the engine 1 through conduit 24, chamber 71, manual cut-off valve 73—74, chamber 93, passage 94, space 98, apertures 103, valve 96, metering orifices 104, conduit 26, flow-divider 27, conduits 28 and 29, and burner nozzles 6 in combustion chamber 5. During steady state operation of the engine, the fuel pressure $(p_f)$ in conduit 24, and in passages up to main metering valve 96, is substantially constant and is determined by the degree of opening of by-pass relief valve 58, which in turn depends upon the loading of spring 68 and the hydraulic pressure $(p_s)$ in chamber 67. The rate of supply or flow of fuel to the engine is determined by the combination of two variable factors: the area $(A_m)$ of the metering orifices 104, and the metering pressure or head $(p_f - p_m)$, $(p_m)$ being the metered fuel pressure in the conduit 26. The area $(A_m)$ depends upon the position of the metering valve 96 which is determined by the difference between the compressor inlet pressure $(p_1)$ in bellows 129 and the compressor discharge pressure $(p_2)$ in the bellows 113, minus the loading on spring 117. Since the difference in pressures $(p_2 - p_1)$ is the rise across the air compressor and is a measure of the mass air flow through the engine, the loading on spring 117 determines the position of metering valve 96 and the value of $A_m$, at any given value of $(p_2 - p_1)$. Hence, the adjustment of the tensions in springs 113 and 119, by lock nuts 118 and adjusting screw 120, respectively, determines the mixture ratio of the fuel and air supplies of the engine.

Fuel is supplied under pump inlet pressure ($p_i$) from conduit 23 to chamber 123, through conduits 31 and 125, and also through conduit 126, chamber 52 and passage 124. From chamber 123, fuel under pressure ($p_i$) also flows through passage 127 to chamber 80 and thence through passage 82 to chamber 83. During steady state operation, the pressure ($p_i$) in all these communicating chambers is the same, but may vary momentarily during acceleration or deceleration, or other variable conditions of operation, as hereinafter explained.

As indicated above, the pump discharge pressure ($p_f$) depends upon the servo pressure ($p_s$) in chamber 67 of relief valve unit 54, and so long as servo valve 149 is exactly in its neutral position, as shown in Figures 3 and 4, its middle valve portion completely cuts off communication between conduits 201, 202 and 203 and the pressure ($p_s$) in conduit 69 and chamber 67 is constant. If now the operator advances manual control lever 38 to a higher speed index 39 on quadrant 40, shaft 36, which is connected to shaft 37, rotates cam 88 in a clockwise direction which pushes plunger 138 down and increases the compression and force of spring 146 on servo valve 149. This increase in force of spring 146 pushes servo valve 149 down, in opposition to the action of arms 151 and bellows 162, and establishes communication between conduits 201 and 202 and permits fuel under pressure ($p_f$) to flow from chamber 71 through conduits 201, 202 and 69 to chamber 67 in relief valve unit 54. The resulting increase in pressure ($p_s$) in chamber 67 moves valve 58 towards its seat 57, reducing the flow of by-passed fuel through conduit 53, chambers 55 and 56 and conduit 31, and thereby increasing the pressure ($p_f$) and flow of fuel through conduit 24, metering valve 96, orifices 104, conduit 26, flow-divider 27 and conduits 28 and 29 to burner nozzles 6.

With increased fuel flow, the engine speed increases, with proportionate increase in mass air flow and compressor rise ($p_2 - p_1$), (compressor sensing pressure). This increase in compressor rise ($p_2 - p_1$), acting through bellows 113 and 129, lowers valve 96 in opposition to spring 117, and increases the area ($A_m$) of orifices 104 to correspond with the increased fuel flow from conduit 24 to valve 96. At the same time, owing to the closing of relief valve 58, there is a simultaneous drop in inlet pressure ($p_i$) in conduit 31 which is transmitted through conduit 125 to chamber 123. This drop in pressure ($p_i$) in conduit 31 is also transmitted through passage 126, chamber 52 and passage 124 to chamber 123, and thence through passages 127 and 82 to chamber 83.

As the engine speed increases with increased fuel flow as described above, the weight arms 151 of the speed governor move outwardly by centrifugal force, in proportion to the increase in engine speed, and aided by the expansion of bellows 162, raise servo valve 149 in opposition to the force of spring 146 until these forces balance, whereupon servo valve again returns to its neutral position and a state of steady engine operation at the new higher speed ensues.

When shaft 36 is rotated by moving manual control lever 38 to the right to a higher speed setting, cam 87 is rotated in a clockwise direction which pushes plunger 210 down and increases the compression and force of spring 211 on check valve 209. This increase in the force of spring 211 on valve 209 enables the valve to hold the higher pressure ($p_s$) in conduits 70 and 69 which has been created by the downward movement of servo valve 149 as just described above. When the increasing pressure ($p_s$) in conduits 69 and 70 reaches a value exceeding the increased force of spring 211, valve 209 opens and permits fuel to flow from conduits 70 and 69 through conduits 217 and 204 into conduit 26, until the pressure ($p_s$) in conduits 69 and 70 falls to a value below the force of spring 211 when valve 209 closes. Since the pressure in conduits 217 and 204 is that of the metered fuel ($p_m$), it is clear that valve 209 will maintain a pressure differential of ($p_s - p_m$), between conduits 69—70 and conduits 217—204, equal to the loading of spring 211, as determined by the position of cam 87 and plunger 210, as long as servo valve 149 prevents communication between conduits 202 and 203. Thus, valve 209, by maintaining a definite relation between the servo pressure ($p_s$) and the metered fuel pressure ($p_m$), serves to keep the pump discharge pressure ($p_f$) in definite relationship with the metered fuel pressure ($p_m$), since the pump discharge pressure ($p_f$) is a definite function of the servo pressure ($p_s$) through the action of relief valve 54.

With the engine in a state of steady operation, when manual control lever is moved to the left to a lower speed position, cam 88 will be rotated in a counterclockwise direction which reduces the throw of the cam and permits plunger 138 to be raised by spring 146. This decreases the compression and force of spring 146 on servo valve 149 which permits arms 151 of the speed governor to push servo valve 149 up, establishing communication between 202 and 203. Liquid fuel at a pressure ($p_s$) now flows from chamber 67 through conduits 69, 202, 203 and 204 to conduit 26, wherein the pressure is ($p_m$). This flow reduces the pressure ($p_s$) in chamber 67 which permits relief valve 58 to open wider and by-pass more fuel around pump 21, with resulting reduction in the pump discharge pressure ($p_f$) and fuel flow to metering valve 96. Accompanying the reduction in pump discharge pressure ($p_f$) and fuel flow to valve 96, are actions through the regulator 25 in the opposite direction from those described above for an increase in pump discharge pressure ($p_f$) and fuel flow to valve 96, all of which result in a reduced fuel supply to the burner nozzles 6 and a corresponding reduction in speed of the engine until the control system again becomes balanced and steady operation of the engine at the desired reduced speed ensues.

With the manual control lever 38 in any fixed position, the corresponding speed of the engine will always tend to remain constant. But, if for any reason there should occur an undesired increase in engine speed, the accompanying increase in compressor rise ($p_2 - p_1$), acting through bellows 113 and 129 will at once depress valve 96 which will increase the fuel flow and speed of the engine. This increased speed, acting first through bellows 162 and then through arms 151 of the speed governor, will immediately raise servo valve 149, which will reduce the pressure ($p_s$) in chamber 67, open relief valve 58, reduce the pump discharge pressure ($p_f$) in conduit 24, and reduce the fuel flow to the engine until its speed falls off to that corresponding to the setting of control lever 38. As long as the actual engine speed exceeds the desired engine speed corresponding to the position of manual control lever 38, the upward thrust of bellows 162 and weight arms 151 of the speed governor will maintain servo valve 149 in raised position until the falling speed of the engine again reaches the desired speed, corresponding to the position of manual control lever 138, whereupon servo valve 149 will return to its neutral position and the engine will thereupon continue to rotate at the desired speed in a state of steady operation. Conversely, if an undesired decrease in engine speed should occur, the reverse action of the above mentioned elements will automatically bring the engine up to the desired speed corresponding to the position of manual control lever 38.

Valve 219 of the thermal override control remains seated at all times unless the temperature in the tail pipe 14 exceeds the prescribed maximum safe limit and the thermal override control has no effect upon the regulator 25. Whenever the temperature in the tail pipe exceeds the prescribed maximum safe limit, bellows 220 raises the right end of lever 222 and reduces the force of spring 223 upon ball check valve 219, whereupon valve 219 opens and permits liquid fuel to flow from conduit 70 into conduit 217, regardless of the action of valve 209. This flow reduces the pressure ($p_s$) in chamber 67 and permits relief valve 58 to open wider and reduce the pump discharge pressure ($p_t$) and the flow of fuel to metering valve 96, which in turn reduces the flow of fuel to the engine and the speed of the engine. The reduction in engine speed reduces the temperature in the tail pipe 14 until it reaches the maximum safe limit, whereupon bellows 220 moves the right end of lever 222 down and valve 219 closes. Thus, the temperature of the engine can never exceed a prescribed safe limit regardless of the operation of the manual control lever 38.

While I have shown and described fuel metering valve 96 as actuated by the pressure rise ($P_2 - P_1$) across the compressor 3, acting through bellows 113 and 129, which are respectively connected to the compressor discharge and air inlet chambers, the same results could also be obtained by evacuating bellows 129 to zero pressure and hermetically sealing it, instead of connecting it to air inlet 2. The difference in pressure ($P_2$) in bellows 113 and ($P_0$) in bellows 129 would then represent the absolute pressure rise across compressor 3, which is also a measure of the mass air flow through the engine, so that the same results would be obtained in the operation of fuel flow regulator 25 by suitable changes in calibration of its elements.

While I have shown and described the preferred embodiment of my invention, I do not limit it to the constructional details disclosed by way of illustration, as these may be changed and modified by those skilled in the art, without departing from the spirit of my invention nor exceeding the scope of the appended claims.

I claim:

1. A fuel and speed control apparatus for an internal combustion engine comprising: an engine driven, constant displacement fuel pump for supplying fuel to said engine, a by-pass relief valve for varying the delivery of said pump, and means, responsive to engine speed and rate of air flow through the engine, acting on said valve for automatically regulating the flow of fuel from said pump to said engine in accordance with predetermined operating requirements of the engine; said means including a centrifugal speed governor and means actuated by rotating inertia element for anticipating the action of said governor.

2. A fuel and speed control apparatus for an internal combustion engine having an air compressor, comprising: an engine driven, constant displacement fuel pump for supplying fuel to said engine, a by-pass relief valve for varying the delivery of said pump, and means, responsive to the pressure rise across the compressor and acting in cooperation with said valve, for automatically regulating the flow of fuel from said pump to said engine in accordance with predetermined operating requirements of the engine; said means including a centrifugal speed governor and means actuated by a rotating inertia element for anticipating the action of said governor.

3. A fuel and speed control apparatus for an internal combustion engine having a manual control lever, comprising: an engine driven, constant displacement fuel pump for supplying fuel to the engine, a by-pass relief valve for varying the delivery of said pump, and means, responsive to said control lever and acting on said valve, for automatically regulating the flow of fuel from said pump to said engine, so as to produce a constant engine speed corresponding to the position of said control lever under varying engine operating conditions; said means including a centrifugal speed governor and means actuated by a rotating inertia element for anticipating the action of said governor.

4. A fuel and speed control apparatus for an internal combustion engine having a manual control lever, comprising: an engine driven, constant displacement fuel pump for supplying fuel to the engine, a by-pass relief valve for varying the delivery of said pump, and means, responsive to said control lever and acting on said valve, for automatically regulating the flow of fuel from said pump to said engine so as to vary the engine speed in proportion to the movement of said control lever; said means including a centrifugal speed governor and means actuated by a rotating inertia element for anticipating the action of said governor.

5. A fuel control apparatus according to claim 1, which includes means for modifying the action of said governor to prevent the speed and/or temperature of the engine from exceeding selected, maximum safe limits.

6. A fuel and speed control apparatus for an internal combustion engine having a manual control lever, comprising: an engine driven, constant displacement fuel pump for supplying fuel to the engine, a by-pass relief valve for varying the delivery of said pump, and means, responsive to said manual control lever and acting on said valve, for automatically regulating the flow of fuel from said pump to said engine so as to maintain a constant engine speed corresponding to the position of said manual control lever despite variations in pressure, load and temperature conditions of the engine; said means including a centrifugal speed governor and means actuated by a rotating inertia element for anticipating the action of said governor.

7. A fuel and speed control apparatus for an internal combustion engine having a manual control lever comprising: an engine driven, constant displacement fuel pump for supplying fuel to the engine, a by-pass relief valve for varying the delivery of said pump, and means, responsive to said manual control lever and to pressure, speed and temperature conditions of the engine and acting on said valve, for automatically regulating the flow of fuel from said pump to said engine in accordance with predetermined operating requirements of the engine; said means including a centrifugal speed governor and means actuated by a rotating inertia element for anticipating the action of said governor.

8. A fuel and speed control apparatus for an internal combustion engine comprising: an engine driven constant displacement fuel pump for supplying fuel to the engine, a by-pass relief valve for varying the delivery of said pump, and means, comprising a plurality of component, coordinated hydraulic systems responsive to pressure, speed and temperature conditions of the engine and acting on said valve, for automatically regulating the flow of fuel from said pump to said engine in accordance with predetermined operating requirements of the engine; said means including a centrifugal speed governor and means actuated by a rotating inertia element for anticipating the action of said governor.

9. A fuel control apparatus according to claim 2, wherein the fuel flow regulating means includes a plurality of component, coordinated hydraulic systems each responsive respectively to pressure, speed and temperature conditions of the engine and all coacting to modify the action of said governor.

10. A fuel control apparatus according to claim 3, wherein the fuel flow regulating means includes a plurality of component, coordinated hydraulic systems each responsive respectively to pressure, speed and temperature conditions of the engine and all coacting to modify the action of said governor.

11. A fuel control apparatus according to claim 4, wherein the fuel flow regulating means includes a plurality of component, coordinated hydraulic systems each responsive respectively to pressure, speed and temperature conditions of the engine and all coacting to modify the action of said governor.

12. A fuel control apparatus according to claim 6, wherein the fuel flow regulating means includes a plurality of component, coordinated hydraulic systems each responsive respectively to pressure, speed and temperature conditions of the engine and all coacting to modify the action of said governor.

13. A fuel control apparatus according to claim 7, wherein the fuel flow regulating means includes a plurality of component, coordinated hydraulic systems each responsive respectively to pressure, speed and temperature conditions of the engine and all coacting to modify the action of said governor.

14. A fuel control system according to claim 7, wherein the fuel flow regulating means includes a plurality of component, coordinated hydraulic systems, each respectively responsive to pressure, speed and temperature conditions of the engine and all coacting to modify the action of said governor.

15. A fuel and speed control apparatus for an internal combustion engine having an air compressor, comprising: a pump for supplying fuel to the engine, a fuel metering valve means, responsive to the pressure rise across the compressor, for regulating the flow of fuel from said pump to said engine in accordance with the flow of air through said compressor; centrifugal speed governor means, responsive to engine speed for regulating said fuel flow in accordance with engine speed, and means actuated by a rotating inertia element for anticipating the action of said governor means.

16. A fuel and speed control apparatus according to claim 15, which includes means coacting to modify the action of said governor and thus automatically vary the pressure of the fuel on the upstream side of said metering valve in accordance with the speed of the engine.

17. A fuel and speed control apparatus according to claim 15, which includes means coacting to modify the action of said governor and thus vary the pressure of the fuel on the upstream side of said metering valve in accordance with the temperature of the engine exhaust gases so that the temperature of the engine never exceeds a predetermined safe limit.

18. For an internal combustion engine having a manual control lever, a fuel and speed control apparatus according to claim 15, which includes means responsive to said manual control lever and coacting with said governor to modify its action and thus vary the pressure of the fuel on the upstream side of the metering valve so that the speed of the engine is responsive to the movement of said manual control lever.

19. A fuel and speed control apparatus for an internal combustion engine having a manual control lever and an air compressor, comprising: a pump for supplying fuel to the engine, a metering valve, responsive to the pressure rise across the compressor, for regulating the flow of fuel from said pump to said engine in accordance with the flow of air through said compressor, and means for varying the pressure of the fuel on the upstream side of said metering valve in accordance with the speed of the engine and/or the movement of said manual lever; said means including a centrifugal speed governor and means actuated by a rotating inertia element for anticipating the action of said governor.

20. A fuel and speed control apparatus according to claim 19, which includes means coacting to modify the action of said governor and thus vary the pressure of the fuel on the upsteam side of the metering valve in accordance with the temperature of the engine exhaust gases so that the temperature of the engine never exceeds a predetermined safe limit.

21. A fuel and speed control apparatus for an internal combustion engine having a manual control lever and an air compressor, comprising: a pump for supplying fuel to the engine, a metering valve, means for varying the opening of said valve in proportion to the pressure rise across the compressor, and means for varying the pressure of the fuel on the upstream side of said valve in accordance with the speed of the engine and/or the movement of said manual control; said last means including a centrifugal speed governor and means actuated by a rotating inertia element for anticipating the action of said governor.

22. A fuel and speed control apparatus according to claim 21, which includes means for varying the pressure of the fuel on the upstream side of the metering valve in accordance with the temperature of the engine exhaust gases so that the temperature of the engine never exceeds a predetermined safe limit.

23. A fuel and speed control apparatus for an internal combustion engine having a manual control lever, comprising: a pump for supplying fuel to the engine, and means for automatically regulating the pressure and flow of fuel from said pump to said engine in accordance with pressure, speed and temperature conditions in the engine, and in proportion to the movement of said manual lever, thereby producing a constant engine speed corresponding to the position of said manual control under varied operating conditions of said engine; said means including a centrifugal, all speed governor and means actuated by a rotating inertia element for anticipating the action of said governor.

24. A fuel and speed control apparatus according to claim 23, wherein means actuated by a rotating inertia element is driven by the engine and comprises means coacting with said governor, for selectively changing the speed of the engine without "hunting" of said regulating means for the new selected speed.

25. A fuel and speed control apparatus according to claim 24, wherein the fuel flow regulating means comprises a plurality of component, coordinated hydraulic systems each responsive respectively to pressure, speed and temperature conditions of the engine and all coacting to modify the action of said governor.

26. A fuel and speed control apparatus for an internal combustion engine having a manual control lever, comprising a pump for supplying fuel to the engine, means for automatically regulating the pressure and flow of fuel from said pump to said engine so as to produce a constant engine speed corresponding to the position of said control lever under varied operating conditions, and means, comprising a centrifugal, all speed governor and means actuated by a rotating inertia element driven by the engine for anticipating the action of said governor, for preventing "hunting" of said fuel regulating means when the engine speed is changed by movement of said control lever.

27. A fuel and speed control apparatus for an internal combustion engine having an air compressor and a manual control lever, comprising: a pump for supplying fuel to the engine, means, including an engine driven, centrifugal, all speed governor, for automatically regulating the pressure and flow of fuel from said pump to said engine so as to produce a constant engine speed corresponding to the position of said control lever under varied operating conditions, and means, responsive to a rotating inertia element driven by the engine for anticipating the action of said governor, whereby change of engine speed is more quickly responsive to movement of said control lever and "hunting" of said regulating means is prevented.

28. In a fuel and speed control apparatus for an internal combustion engine, a centrifugal, all speed governor driven by the engine and comprising: means for varying the flow of fuel to the engine in accordance with engine speed and means for anticipating the action of said governor comprising a fluid pressure regulating valve rotated in constant speed relation to said governor and a rotating inertia element elastically connected to and driven by said valve and adapted to vary the opening of said valve in either direction in proportion to the rate of change in the speed of rotation of said valve.

29. A fuel and speed control apparatus as in claim 28, including a pressure responsive element subject to a fluid pressure regulated by said valve and coacting with said governor to supplement the action of said governor.

30. A fuel and speed control apparatus for an internal combustion engine comprising: an engine driven variable displacement fuel pump for supplying fuel to said engine, means for varying the delivery of said pump, and means acting on said delivery varying means for automatically regulating the fuel flow from said pump to said engine in accordance with predetermined operating requirements of the engine; said last means including a centrifugal speed governor and means actuated by a rotating inertia element for anticipating the action of said governor.

LEIGHTON LEE II.

References Cited in the file of this patent

UNITED STATES PATENTS

| Number | Name | Date |
|---|---|---|
| 2,245,562 | Becker | June 17, 1941 |
| 2,306,953 | Jung | Dec. 29, 1942 |
| 2,407,982 | Hanna et al. | Sept. 24, 1946 |
| 2,411,065 | Silvester | Nov. 12, 1946 |
| 2,422,808 | Stokes | June 24, 1947 |
| 2,441,948 | Atkinson | May 25, 1948 |
| 2,457,595 | Orr | Dec. 28, 1948 |
| 2,472,181 | Werth | June 7, 1949 |
| 2,509,648 | Mock | May 30, 1950 |
| 2,514,674 | Schorn | July 11, 1950 |
| 2,581,275 | Mock | Jan. 1, 1952 |

FOREIGN PATENTS

| Number | Country | Date |
|---|---|---|
| 595,152 | Great Britain | Nov. 27, 1947 |